US012132285B2

(12) United States Patent
Costello

(10) Patent No.: US 12,132,285 B2
(45) Date of Patent: Oct. 29, 2024

(54) SENSE MODULE FOR A POWER CONNECTOR SYSTEM

(71) Applicant: TE Connectivity Solutions GmbH, Schaffhausen (CH)

(72) Inventor: Brian Patrick Costello, Scotts Valley, CA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 352 days.

(21) Appl. No.: 17/752,257

(22) Filed: May 24, 2022

(65) Prior Publication Data

US 2023/0387637 A1 Nov. 30, 2023

(51) Int. Cl.

| | |
|---|---|
| ***H01R 12/00*** | (2006.01) |
| ***H01R 12/70*** | (2011.01) |
| ***H01R 13/502*** | (2006.01) |
| ***H01R 13/641*** | (2006.01) |
| ***H01R 13/66*** | (2006.01) |
| ***H01R 25/14*** | (2006.01) |

(52) U.S. Cl.

CPC ......... *H01R 25/14* (2013.01); *H01R 12/7047* (2013.01); *H01R 13/502* (2013.01); *H01R 13/641* (2013.01); *H01R 13/665* (2013.01)

(58) Field of Classification Search

CPC .. H01R 25/14; H01R 12/4047; H01R 13/502; H01R 13/641; H01R 13/665

USPC ........................................................ 439/65, 71

See application file for complete search history.

(56) References Cited

U.S. PATENT DOCUMENTS

| | | | | |
|---|---|---|---|---|
| 2,701,346 A * | 2/1955 | Powell | H01R 12/722 439/325 | |
| 5,190,462 A * | 3/1993 | Lauchner | H01R 13/26 439/284 | |
| 9,431,783 B1 * | 8/2016 | Costello | H01R 12/7088 | |

* cited by examiner

*Primary Examiner* — Phuong K Dinh

(57) ABSTRACT

A connector assembly includes a power connector having first and second power interfaces that interface with first and second power components. The power connector includes a shell forming a cavity and having a shell slot at the first power interface to receive the first power component. A power contact is received in the cavity that extends between the first power interface and the second power interface to electrically connect the first power component to a power circuit of the second power component. The connector assembly includes a sense connector separate and discrete from the power connector. The sense connector includes first and second sense interfaces configured to interface with the first and second power components. The sense connector includes a housing holding a sense contact and electrically isolating the sense contact from the shell. The sense contact electrically connect the first power component to a sense circuit of the second power component.

20 Claims, 7 Drawing Sheets

SENSE MODULE FOR A POWER CONNECTOR SYSTEM

BACKGROUND OF THE INVENTION

The subject matter herein relates generally to power connector systems.

Power connectors are used to electrically connect components, such as a printed circuit board with a busbar to supply power to the printed circuit board. When the power connector mates to the power source, such as the busbar, the potential exists for power to arc across the interface as the power connector is mated or unmated. Some systems use hot swap circuitry to prevent arcing by delaying power on until the power contacts are fully and reliably mated and powering off the power contacts before the power contacts are unmated. Some known power connectors include sense contacts that are included within the power connector, such as held in the housing of the power connector adjacent the power contacts. However, some known power connectors include metal shells. Such power connectors cannot hold sense contacts therein because the sense contacts may be electrically connected to the power contacts or the metal shell.

A need remains for a power connector system having a sense module for sensing a mating state of the power connector within the power connector system.

BRIEF DESCRIPTION OF THE INVENTION

In one embodiment, a connector assembly is provided and includes a power connector including a first power interface configured to interface with a first power component and a second power interface configured to interface with a second power component. The power connector includes a shell having a first wall and a second wall forming a cavity. The shell has a shell slot at the first power interface to receive the first power component. The power connector includes a power contact received in the cavity. The power contact extends between the first power interface and the second power interface to electrically connect the first power component to a power circuit of the second power component. The connector assembly includes a sense connector separate and discrete from the power connector. The sense connector includes a first sense interface configured to interface with the first power component and a second sense interface configured to interface with the second power component. The sense connector includes a housing holding a sense contact. The housing electrically isolates the sense contact from the shell. The sense contact extends between the first sense interface and the second sense interface to electrically connect the first power component to a sense circuit of the second power component.

In another embodiment, a power connector system is provided and includes a power substrate including a power circuit. The power connector system includes a power connector mounted to the power substrate. The power connector includes a first power interface configured to interface with a power component and a second power interface electrically connected to the power circuit of the power substrate. The power connector includes a shell having a first wall and a second wall forming a cavity. The shell has a shell slot at the first power interface to receive the first power component. The power connector includes a power contact received in the cavity. The power contact extends between the first power interface and the second power interface to electrically connect the first power component to the power circuit of the power substrate. The power connector system includes a sense connector separate and discrete from the power connector. The sense connector is mounted to the power substrate. The sense connector includes a first sense interface configured to interface with the first power component. The sense connector includes a housing holding a sense contact. The housing electrically isolates the sense contact from the shell. The sense contact electrically connects the first power component and a sense circuit configured to control power supply between the first power component at the power circuit.

In a further embodiment, a power connector system is provided and includes a power substrate having a first side and a second side. The power connector system includes a power connector mounted to the first side of the power substrate. The power connector includes a first power interface configured to interface with a power component and a second power interface electrically connected to the first side of the power substrate. The power connector includes a shell having a first wall and a second wall forming a cavity. The shell has a shell slot at the first power interface to receive the first power component. The power connector includes a power contact received in the cavity. The power contact extends between the first power interface and the second power interface to electrically connect the first power component to the power substrate. The power connector system includes a sense connector separate and discrete from the power connector. The sense connector mounted to the power substrate. The sense connector includes a first sense interface configured to interface with the first power component. The sense connector includes a housing holding a sense contact. The housing electrically isolates the sense contact from the shell. The sense connector includes a sense wire terminated to the sense contact. The sense wire extends from the housing to electrically connect the first power component to a sense circuit to control power supply between the first power component and the power substrate.

DETAILED DESCRIPTION OF THE INVENTION

Figure 1:
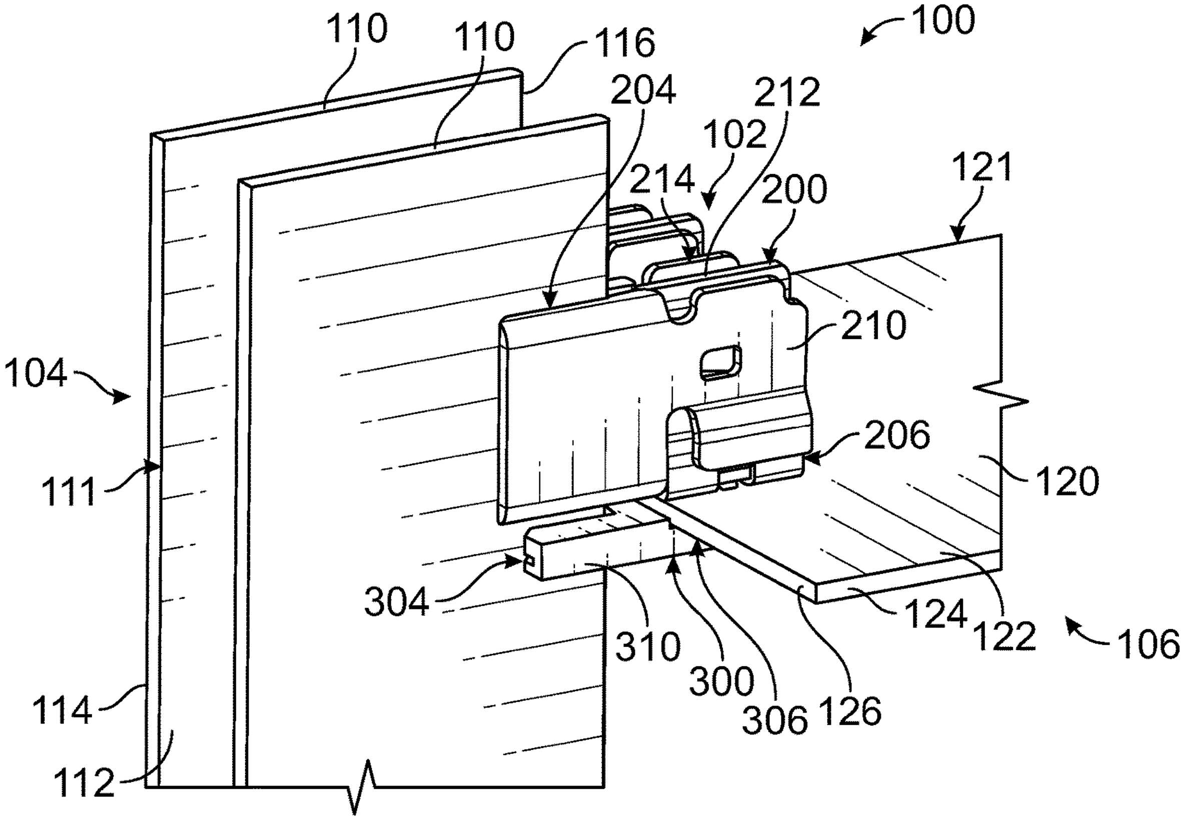
FIG. 1 is a top perspective view of a power connector system in accordance with an exemplary embodiment.
Figure 2:
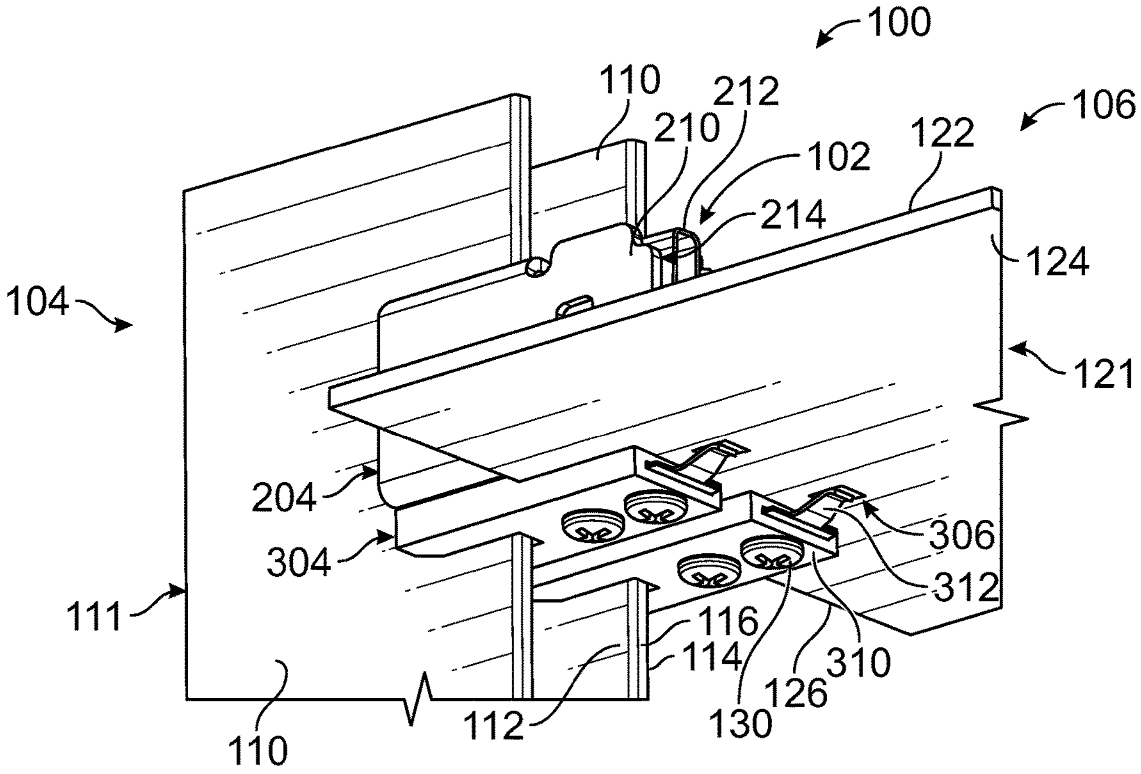
FIG. 2 is a bottom perspective view of the power connector system in accordance with an exemplary embodiment.

FIG. 1 is a top perspective view of a power connector system 100 in accordance with an exemplary embodiment. FIG. 2 is a bottom perspective view of the power connector system 100 in accordance with an exemplary embodiment. The power connector system 100 includes a connector assembly 102 used to electrically connect and supply power between a first power component 104 and a second power component 106. The first power component 104 may be a power source used as a power supply. The second power component 106 may be a power receiver that is powered when electrically connected to the first power component 104.

In an exemplary embodiment, the connector assembly 102 of the power connector system 100 includes a sense module for sensing the mated state of the connector assembly 102 between the first and second power components 104, 106 to control power supply between the first and second power components 104, 106. For example, the sense module senses when the connector assembly 102 is mated to the first and second power components 104, 106 and senses when the connector assembly 102 is unmated from the first power component 104 and/or the second power component 106. The sense module may be used to control the power supply, such as by switching the power supply on and off based on the mating state of the connector assembly 102, such as to prevent electrical arcing or damage to the components during mating to and unmated. The sense module prevents arcing by delaying power on until the power contacts are fully and reliably mated and powering off the power contacts before the power contacts are unmated.

In an exemplary embodiment, the first power component 104 includes a power substrate 111 having a power circuit. In the illustrated embodiment, the power substrate 111 defining the first power component 104 is a busbar 110. In the illustrated embodiment, the first power component 104 includes a pair of the busbars 110. However, greater or fewer busbars 110 may be provided in alternative embodiments. Each busbar 110 is a metal plate configured to supply power to one or more of the second power components 106 through the connector assembly(ies) 102. The busbar 110 includes a first side 112 and a second side 114 opposite the first side 112. The busbar 110 includes an edge 116 at the front of the busbar 110. In an exemplary embodiment, the edge 116 is configured to be plugged into the connector assembly 102. The connector assembly 102 is configured to be mated to the first side 112 and/or the second side 114 to electrically connect to the busbar 110. In an exemplary embodiment, the connector assembly 102 is coupled to the busbar 110 at a separable mating interface. For example, the busbar 110 may be plugged into and unplugged from the connector assembly 102.

In various embodiments, the busbar 110 may include a cap 118 along the edge 116. The cap 118 may be intuitive, such as plastic or rubber, to prevent inadvertent touching of the edge 116 of the busbar 110. In various embodiments, a housing (not shown) may surround the busbar 110, such as along the first side 112 and/or the second side 114, to prevent inadvertent touching of the busbar 110.

In an alternative embodiment, the first power component 104 may be another type of electrical component, such as a printed circuit board having one or more circuits on the printed circuit board. The printed circuit board may be used to supply power to the second power component 106 through the connector assembly 102. However, in alternative embodiments, the printed circuit board may receive power from the second power component 106 through the connector assembly 102.

In an exemplary embodiment, the second power component 106 includes a power substrate 121 having a power circuit. In the illustrated embodiment, the power substrate 121 defining the second power component 106 is a printed circuit board 120. In the illustrated embodiment, a single printed circuit board 120 is shown coupled to the busbars 110; however, additional printed circuit boards 120 may be coupled to the busbars 110 along the mating faces of the busbars 110. Other components (not shown) may be mounted to the printed circuit board 120 connected to the power circuit of the printed circuit board 120. The power supplied to the printed circuit board 120 through the connector assembly 102 is supplied to the other components through the power circuit. For example, a processor or other electrical component may be mounted to the printed circuit board 120 and powered by the power circuit.

The printed circuit board 120 includes a first side 122 and a second side 124 opposite the first side 122. The printed circuit board 120 includes an edge 126 at the front of the printed circuit board 120. In an exemplary embodiment, the connector assembly 102 is mounted to the printed circuit board 120 at the edge 126. For example, components of the connector assembly 102 may be mounted to the first side 122 and/or the second side 124. The components of the connector assembly 102 may extend forward of the edge 126 for mating with the busbars 110. In various embodiments, the components of the connector assembly 102 may be soldered to the printed circuit board 120. In other various embodiments, the components of the connector assembly 102 may be connected to the printed circuit board 120 by a press-fit connection. In alternative embodiments, the components of the connector assembly 102 may be connected to the printed circuit board 120 at a separable interface. In an exemplary embodiment, the components of the connector assembly 102 are connected to the printed circuit board 120 using fasteners 130, such as bolt or screws.

In an alternative embodiment, the second power component 106 may be another type of electrical component, such as a busbar. In various embodiments, the second power component 106 may be used to supply power to the first power component 104 through the connector assembly 102.

In an exemplary embodiment, the connector assembly 102 includes a power connector 200 and a sense connector 300 separate and discrete from the power connector 200.

The sense connector 300 provides a sense module within the system without the need for redesigning or retooling the power connector 200. The sense connector 300 provides a sense contact that is electrically isolated from the power connector 200. The sense module 300 may be used to retrofit existing systems. The power connector 200 and the sense connector 300 are configured to be electrically connected to the first and second power components 104, 106. In the illustrated embodiment, multiple power connectors 200 and multiple sense connectors 300 are provided, each being electrically connected to the corresponding busbar 110 in printed circuit board 120. The power connector 200 supplies power between the first and second power component 104, 106. The sense connector 300 senses a mating state of the connector assembly 102 with the first power component 104 and/or the second power component 106. Optionally, a power control circuit may be controlled based upon the mating state sensed by the sense connector 300. For example, the power control circuit may turn the power supply on and off based upon the mating state. In other embodiments, the power control circuit may control a switch to control (for example, open/close) the power circuit of the first power connector 104 and/or the second power connector 106 based upon the mating state.

The power connector 200 includes a first power interface 204 configured to interface with the first power component 104 and a second power interface 206 configured to interface with the second power component 106. In various embodiments, the first power interface 204 is a separable interface. In various embodiments, the second power interface 206 is a permanent interface, such as a solder or press-fit connection. However, in alternative embodiments, the second power interface 206 may be a separable interface.

In an exemplary embodiment, the power connector 200 includes a shell 210 and the power contact 212 received in the shell 210. The shell 210 and/or the power contacts 212 are configured to be electrically connected to the printed circuit board 120 and are configured to be electrically connected to the corresponding busbar 110. In an exemplary embodiment, the shell 210 is electrically conductive and electrically connected to the power contact 212. The current and/or voltage transmitted through the power connector 200 may be based on the size and/or the shape and/or the material of the shell 210 and the power contacts 212, may be based on the points of contact (number and locations) between the shell 210 and the power contact 212, and may be based on the points of contact between the power connector 200 and the busbar 110 and the printed circuit board 120.

The sense connector 300 includes a first sense interface 304 configured to interface with the first power component 104 and a second sense interface 306 configured to interface with the second power component 106, such as with a sense circuit of the second power component 106. The sense circuit may be a hot swap circuit. The sense circuit may include a processor or electrical components that control the power supply through the power connector system. The sense circuit may be operably connected to the power source, such as the power supply. The sense circuit may be operably connected to the power circuit of the second power component 106 to control power flow through power circuit (for example, to open and close the power circuit, such as by controlling a switch of the power circuit). In various embodiments, the first sense interface 304 is a separable interface. In various embodiments, the second sense interface 306 is a separable interface. However, in alternative embodiments, the second sense interface 306 may be a permanent interface, such as a solder or press-fit connection.

In an exemplary embodiment, the sense connector 300 includes a housing 310 and a sense contact 312 (shown in FIG. 3) received in the housing 310. The sense contact 312 is configured to be electrically connected to the busbar 110 and the printed circuit board 120. For example, the sense contact 312 is electrically connected to a sense circuit of the printed circuit board 120. The sense contact 312 is used to determine when the sense connector 300 is mated to the busbar 110 and when the sense connector 300 is unmated from the busbar 110. Signals (for example, current or voltage, on the sense circuit of the printed circuit board 120 may be used to control the power circuit on the printed circuit board 120 to allow or restrict power from the power connector 200 to the other components mounted to the printed circuit board 120. In an exemplary embodiment, the housing 310 is insulative, such as being manufactured from a dielectric material, such as a plastic material. The housing 310 electrically isolates the sense contact 312 from the power connector 200.

Figure 3:
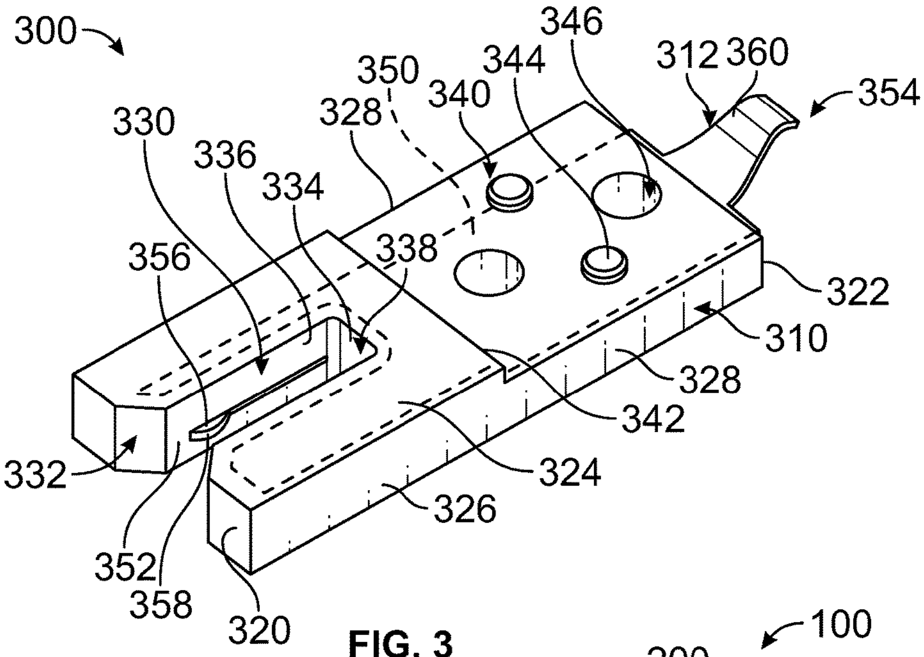
FIG. 3 is a perspective view of the sense connector in accordance with an exemplary embodiment.

FIG. 3 is a perspective view of the sense connector 300 in accordance with an exemplary embodiment. The sensor connector includes the housing 310 and the sense contact 312. The housing 310 extends between a front 320 and a rear 322. The housing 310 includes a first side 324 and a second side 326. The housing 310 includes edges 328 between the first and second sides 324, 326. The housing 310 is manufactured from a dielectric material, such as a plastic material. In an exemplary embodiment, the housing 310 is overmolded over the sense contact 312. For example, the housing 310 may be molded in place around the sense contact 312. In alternative embodiments, the housing 310 may be preformed and the sense contact 310 is loaded into the housing 310, such as through the rear 322.

The housing 310 includes a housing slot 330 at the front 320. The housing slot 330 is configured to receive the busbar 110. In an exemplary embodiment, the housing slot 330 includes chamfered surfaces 332 at the front 320 to widen the housing slot 330 at the front 320. The chamfered surfaces 332 guide the busbar 110 into the housing slot 330. In an exemplary embodiment, the housing 310 includes a pair of silos 335 at the front 320 on opposite sides of the housing slot 330. Portions of the sense contact 312 extend into the corresponding silos 335 on opposite sides of the housing slot 330 to interface with the busbar 110. The housing slot 330 is defined by side walls 334, 336 and an end wall 338. The side walls 334, 336 oppose each other on opposite sides of the housing slot 330. The side walls 334, 336 are configured to face opposite sides of the busbar 110. The sense contact 312 extends to the housing slot 330 to interface with the busbar 110. For example, the sense contact 312 may be exposed along the side walls 334, 336 to interface with the busbar 110.

The housing 310 includes a pocket 340 along the first side 324. The pocket 340 is configured to receive the printed circuit board 120. A lip 342 is located forward of the pocket 340. The pocket 340 may be open between the lip 342 and the rear 322 of the housing 310. The pocket 340 may be open between the edges 328. In an exemplary embodiment, the housing 310 includes locating posts 344 extending into the pocket 340. The locating posts 344 are used to locate the sense connector 300 relative to the printed circuit board 120. The locating posts 344 may be received in openings in the printed circuit board 120. Optionally, the locating posts 344 may be sized differently or shaped differently for keyed mating with the printed circuit board 120. Any number of the locating posts 344 may be provided in various embodiments.

In an exemplary embodiment, the housing 310 includes openings 346 extending between the first side 324 and the second side 326. The openings 346 are configured to receive the fasteners 130 (shown in FIG. 2). In an exemplary embodiment, the openings 346 pass through the sense contact 312. In an exemplary embodiment, the housing 310 covers the sense contact 312 through the openings 346 to isolate the sense contact 312 from the fasteners 130.

The sense contact 312 is a conductive contact configured to be electrically connected to the busbar 110 and electrically connected to the printed circuit board 120. In an exemplary embodiment, the sense contact 312 is a stamped and formed contact. The sense contact 312 may be overmolded by the housing 310 such that the housing 310 covers portions of the sense contact 312 to electrically isolate the sense contact 312 from the power connector 200 (shown in FIG. 2).

The sense contact 312 includes a main body 350 (shown in phantom) extending between a mating end 352 and a terminating end 354. The mating end 352 is configured to be coupled to the busbar 110. In the illustrated embodiment, the mating end 352 includes a pair of mating beams 356 extending forward of the main body 350. The mating beams 356 extend along opposite sides of the housing slot 330. The mating beams 356 have mating interfaces 358 at or near distal ends of the mating beams 356. The mating interfaces 358 are configured to directly engage the busbar 110. Optionally, the mating beams 356 may be curved at the mating interfaces 358. The mating interfaces 358 may define separable interfaces configured to be mated to and unmated from the busbar 110. For example, the mating interfaces 358 may slide along the busbar 110 during mating with and unmated from the busbar 110. Other types of mating elements may be provided at the mating end 352, such as spring beams, blades, pins, sockets, compliant pins, solder tabs, and the like.

The terminating end 352 is configured to be terminated to the printed circuit board 120. In the illustrated embodiment, the terminating end 354 includes a spring beam 360 extending rearward from the main body 350. The spring beam 360 is configured to be spring biased against the printed circuit board 120. For example, the spring beam 360 may be deflected when mated to the printed circuit board 120 creating an internal spring biasing force that maintains reliable mechanical and electrical connection to the printed circuit board 120. Other types of mating elements may be provided at the terminating end 354, such as fixed beams, blades, pins, sockets, compliant pins, solder tabs, and the like. In an exemplary embodiment, the terminating end 354 extends to an exterior of the housing 310 for electrical connection to the printed circuit board 120. For example, the terminating end 354 extends rearward from the rear 322 of the housing 310. The sense contact 312 may include multiple spring beams 360 in alternative embodiments creating multiple points of contact with the printed circuit board 120.

Figure 4:
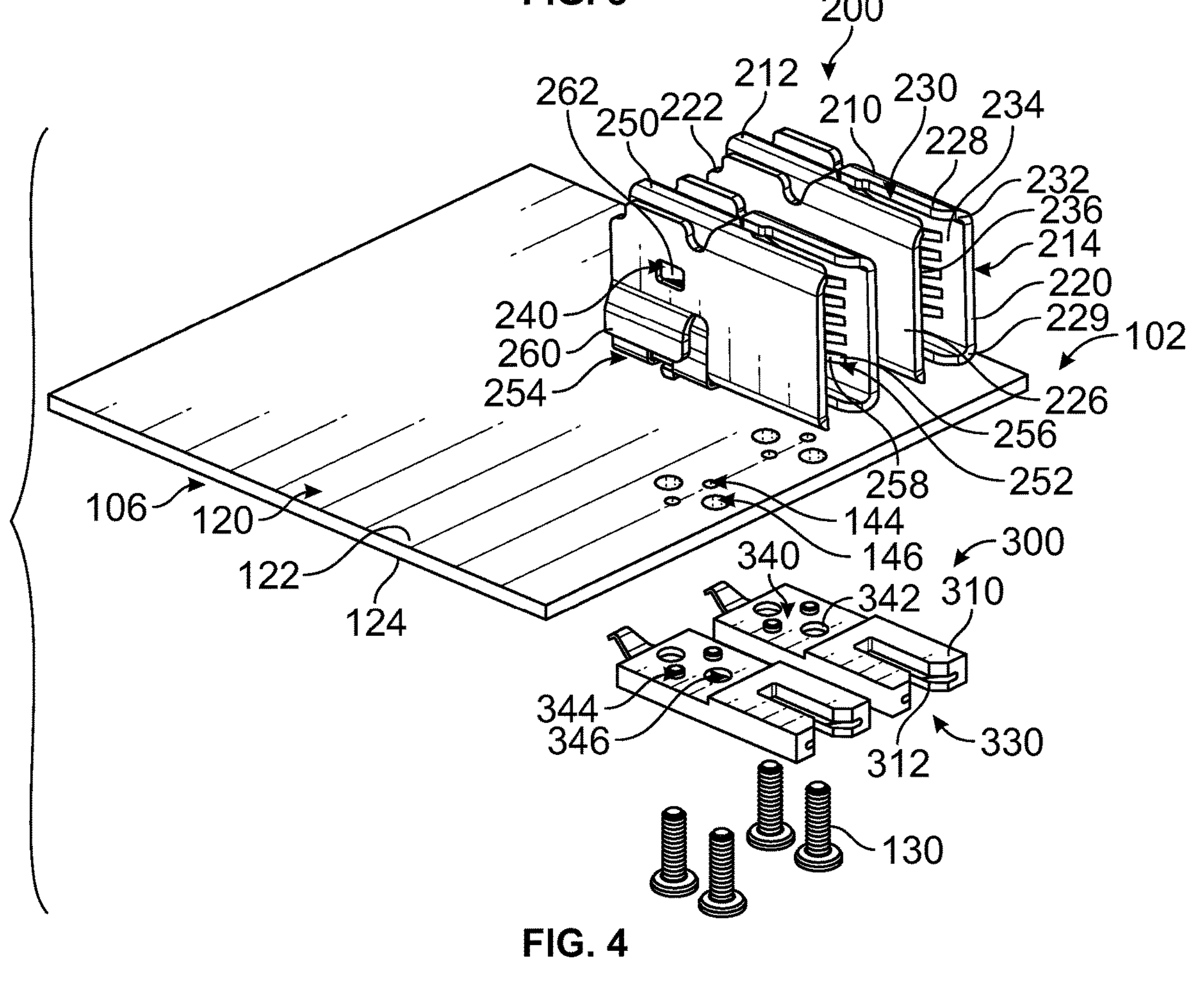
FIG. 4 is an exploded view of a portion of the power connector system showing the connector assemblies poised for coupling to the second power component in accordance with an exemplary embodiment.

FIG. 4 is an exploded view of a portion of the power connector system 100 showing the connector assemblies 102 poised for coupling to the second power component 106. For example, the power connectors 200 and the sense connector 300 are poised for coupling to the printed circuit board 120. In an exemplary embodiment, the power connectors 200 are coupled to opposite sides of the printed circuit board 120 as the sense connectors 300. For example, the power connectors 200 are coupled to the first side 122 (for example, the top) and the sense connectors 300 are coupled to the second side 124 (for example, the bottom).

In an exemplary embodiment, the shell 210 is electrically conductive. For example, the shell 210 may be manufactured from a metal material. In an exemplary embodiment, the shell 210 is stamped and formed from a metal sheet. The shell 210 forms a cavity 214 that receives the power contact 212. The power contact 212 is electrically conductive and configured to be electrically connected to the shell 210. The power contact 212 is configured to be electrically connected to the busbar 110 to electrically connect the shell 210 to the busbar 110. The power contact 212 is configured to be electrically connected to the printed circuit board 120 to electrically connect the shell 210 to the printed circuit board 120.

The shell 210 extends between a front 220 and a rear 222. The shell 210 includes a first side 224 and a second side 226. The shell 210 includes a top 228 and a bottom 229. The shell 210 includes a shell slot 230 at the front 220. The shell slot 230 is configured to receive the busbar 110. The shell slot 230 is open at the top 228 and the bottom 229 to allow the busbar 110 to pass through the shell 210. In an exemplary embodiment, the shell slot 230 includes chamfered surfaces 232 at the front 220 to widen the shell slot 230 at the front 220. The chamfered surfaces 232 guide the busbar 110 into the shell slot 230.

The shell slot 230 is defined by side walls 234, 236. The side walls 234, 236 oppose each other on opposite sides of the shell slot 230. The side walls 234, 236 are configured to face opposite sides of the busbar 110. The power contact 212 is located in the cavity 214 and extends along the side walls 234, 236. The power contact 212 is exposed within the shell slot 230 to interface with the busbar 110. In an exemplary embodiment, the shell 210 includes latch pockets 240 in the side walls 234, 236 that receive latching features of the power contact 212 to hold the power contact 212 in the cavity 214.

In an exemplary embodiment, the shell 210 is secured to the printed circuit board 120 using the fasteners 130. For example, the fasteners 130 may be threadably coupled to the shell 210. In various embodiments, the shell 210 may include mounting tabs (not shown) or other features for mounting the shell 210 to the printed circuit board 120. For example, the mounting tabs may be solder tabs configured to be soldered to the first side 122 of the printed circuit board 120. In other various embodiments, the mounting tabs may be compliant pins configured to be press-fit into the printed circuit board 120 to mechanically and electrically connect the shell 210 to the printed circuit board 120.

The power contact 212 is a conductive contact configured to be electrically connected to the busbar 110 and electrically connected to the printed circuit board 120. In an exemplary embodiment, the power contact 212 is a stamped and formed contact. In various embodiments, the power contact 212 may be manufactured from a different material than the shell 210 or may be plated with a different material than the shell 210. In various embodiments, the power contact 212 is stamped from a metal sheet having a different thickness than the metal sheet used to form the shell 210. The power contact 212 may be loaded into the cavity 214, such as through the rear 222 or the bottom 229 of the shell 210. Alternatively, the shell 210 may be formed around the power contact 212.

The power contact 212 includes a main body 250 extending between a mating end 252 and a terminating end 254. In an exemplary embodiment, the power contacts 212 is a right-angle contact having the mating end 252 perpendicular to the terminating end 254. For example, the mating end 252 may be provided at the front of the power contact 212 and the terminating end 254 may be provided at the bottom of the power contact 212. Other orientations are possible in alternative embodiments, including having the mating end 252 and the terminating end 254 at opposite ends of the main body 250.

The mating end 252 is configured to be coupled to the busbar 110. In the illustrated embodiment, the mating end 252 includes a plurality of mating beams 256 extending forward of the main body 250. In an exemplary embodiment, the mating beams 256 are deflectable mating beams, such as spring beams configured to be compressed when engaging the busbar 110. The mating beams 256 extend toward the front 220 of the shell 210 and are located along opposite sides of the shell slot 230, such as to mate with opposite sides of the busbar 110. The mating beams 256 have mating interfaces 258 at or near distal ends of the mating beams 256. The mating interfaces 258 are configured to directly engage the busbar 110. Optionally, the mating beams 256 may be curved at the mating interfaces 258. The mating interfaces 258 may define separable interfaces configured to be mated to and unmated from the busbar 110. For example, the mating interfaces 258 may slide along the busbar 110 during mating with and unmated from the busbar 110. Other types of mating elements may be provided at the mating end 252, such as blades, pins, sockets, compliant pins, solder tabs, and the like.

The terminating end 252 is configured to be terminated to the printed circuit board 120. In the illustrated embodiment, the terminating end 254 includes a solder tab 260 extending along the bottom of the power contact 212. The solder tab 260 is configured to be soldered to the power circuit of the printed circuit board 120. Other types of terminating elements may be provided at the terminating end 254, such as spring beams, blades, pins, sockets, compliant pins, and the like. In an exemplary embodiment, the terminating end 254 extends to an exterior of the shell 210 for electrical connection to the printed circuit board 120. For example, the terminating end 254 extends downward from the bottom 229 of the shell 210. The terminating end 254 may be located proximate to the rear 222 of the shell 210.

In an exemplary embodiment, the power contact 212 includes a latch 262 extending from the main body 250. The latch 262 is received in the corresponding latch pocket 240 of the shell 210. The latch 262 secures the power contact 212 relative to the shell 210.

During assembly, the power connectors 200 are aligned with corresponding mating areas at the first side 122 of the printed circuit board 120 and the sensor connectors 300 are aligned with corresponding mating areas at the second side 124 of the printed circuit board 120. The sensor connectors 300 are aligned with the power connectors 200. For example, the housing slots 330 of the housing 310 may be aligned with the shell slots 230 of the shells 210 to receive the corresponding busbars 110.

During assembly, the pocket 340 of the housing 310 is aligned with the printed circuit board 120 such that the lip 342 is located forward of the edge 126 of the printed circuit board 120. The locating posts 344 are aligned with locating openings 144 in the printed circuit board 120. During mating, the locating posts 344 may be loaded into the locating openings 144. The housing 310 is held against the second side 124 of the printed circuit board 120. The front end of the housing 310 extends forward of the printed circuit board 120.

During assembly, the power connectors 200 are mounted to the first side 122 of the printed circuit board 120. Locating features, such as pins or other protrusions, of the power connectors 200 may be received in the locating openings 144. The mounting features of the power connectors 200 may be mounted to the printed circuit board 120. For example, solder tabs of the power connectors 200 may be soldered to the printed circuit board 120.

During assembly, the fasteners 130 pass through the openings 346 and pass-through openings 146 in the printed circuit board 120 to secure the sensor connectors 300 to the printed circuit board 120. In an exemplary embodiment, the fasteners 130 pass through the printed circuit board 120 to couple to the power connectors 200. For example, the fasteners 130 may be threadably coupled to the power connectors 200. As such, the same fasteners 130 may be used to secure both the sensor connectors 300 and the power connectors 200 to the printed circuit board 120. However, in alternative embodiments, separate fasteners may be used for the sensor connectors 300 and the power connectors 200.

FIGS. 5-10 illustrate a mating sequence of the connector assembly 102 with the first power component 104. FIGS. 5-10 illustrate the connector assembly 102 mounted to the second power component 106. In an exemplary embodiment, the second power component 106, with the connector assembly 102, is mated to the first power component 104 in a mating direction 140. However, in alternative embodiments, the first power component 104 may be mated to the connector assembly 102 in a mating direction opposite to the mating direction 140 shown in FIGS. 5-10.

Figure 5:
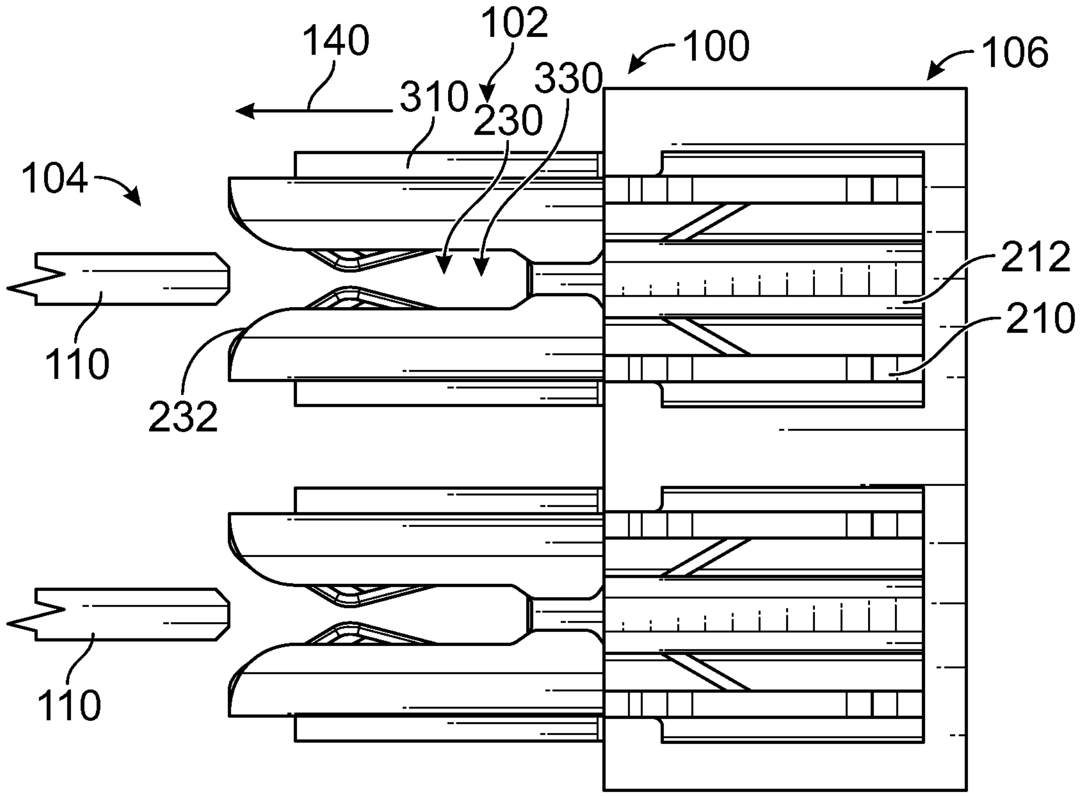
FIG. 5 is a top view of the power connector system showing the connector assembly and the second power component poised for mating with the first power connector in accordance with an exemplary embodiment.

FIG. 5 is a top view of the power connector system 100 showing the connector assembly 102 and the second power component 106 poised for mating with the first power connector 104. During mating, the busbars 110 are aligned with the shell slots 230 of the shells 210 and the housing slots 330 of the housing 310. The chamfered surfaces 232 to align the connector assembly 102 with the busbars 110. In an exemplary embodiment, the widths of the shell slot 230 and the housing slots 330 may be oversized (for example, wider than) relative to the busbars 110 to allow unobstructed plugging of the connector assembly 102 onto the busbars 110. The shells 210 in the housing 310 do not interfere with mating, which could otherwise cause friction and make mating more difficult.

Figure 6:
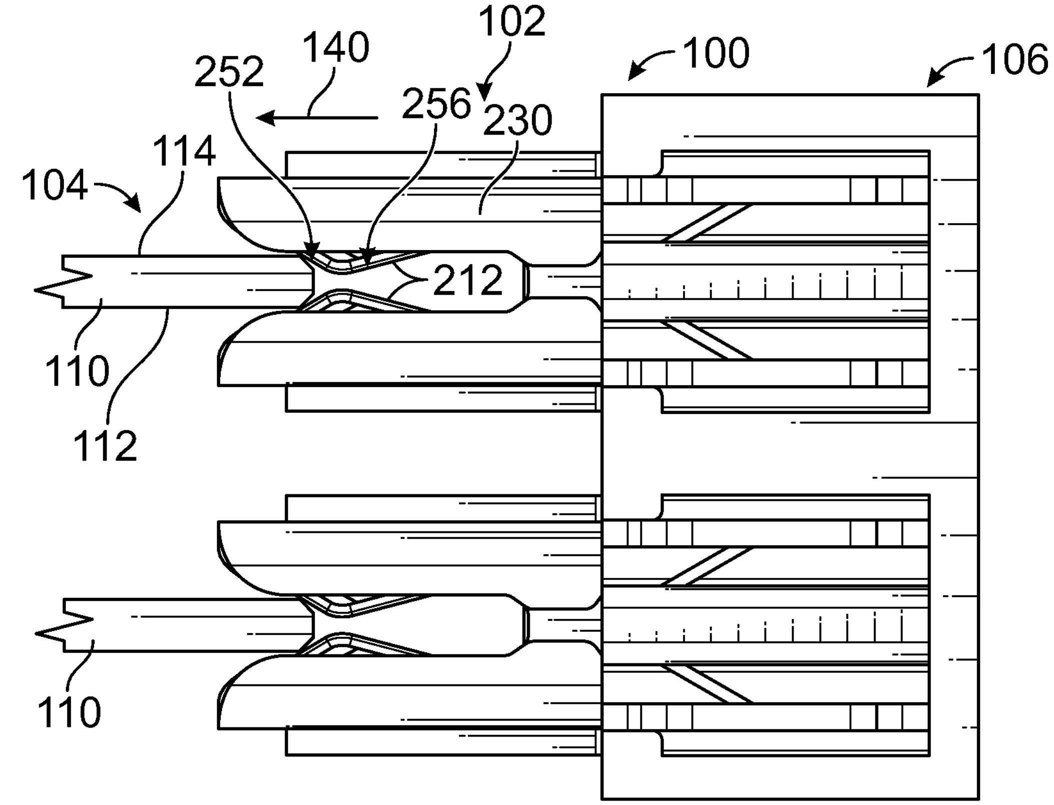
FIG. 6 is a top view of the power connector system showing the connector assembly and the second power component partially mated with the first power connector in accordance with an exemplary embodiment.

FIG. 6 is a top view of the power connector system 100 showing the connector assembly 102 and the second power component 106 partially mated with the first power connector 104. FIG. 6 shows the busbars 110 immediately before engagement with the power contacts 212. The mating ends 252 of the power contacts 212 extend into the shell slot 230 to engage the busbar 110. The power contacts 212 are located on both sides of the shell slot 230 to interface with both sides 112, 114 of the busbar 110. The distal ends of the mating beams 256 of the power contacts 212 are flared outward to guide mating of the mating beams 256 with the busbar 110. The power contacts 212 are not electrically connected to the busbars 110 prior to contact of the mating beams 256 with the busbars 110.

Figure 7:
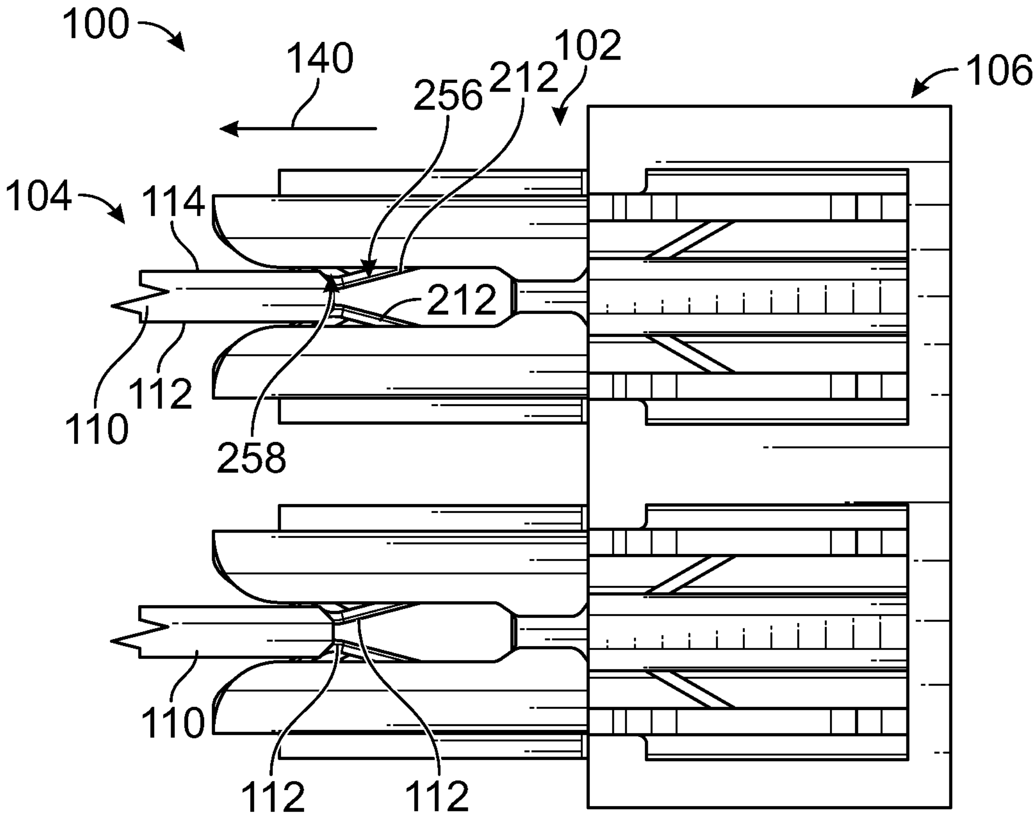
FIG. 7 is a top view of the power connector system showing the connector assembly and the second power component partially mated with the first power connector in accordance with an exemplary embodiment.

FIG. 7 is a top view of the power connector system 100 showing the connector assembly 102 and the second power component 106 partially mated with the first power connector 104. FIG. 7 shows the busbars 110 reliably connected to the power contacts 212. As the connector assembly 102 continues in the mating direction 140, the mating beams 256 of the power contacts 212 slide along the sides 112, 114 of the busbar 110. The mating interfaces 258 engage the sides 112, 114 to create a reliable electrical connection between the power contacts 212 and the busbar 110.

Figure 8:
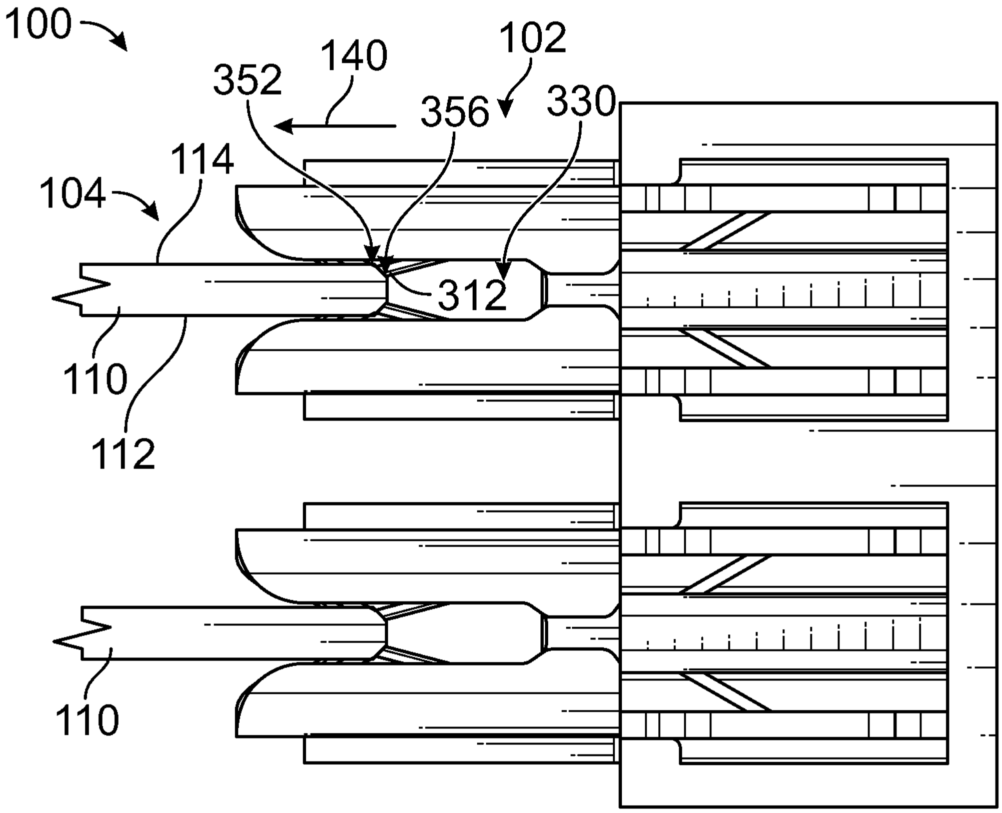
FIG. 8 is a top view of the power connector system showing the connector assembly and the second power component partially mated with the first power connector in accordance with an exemplary embodiment.

FIG. 8 is a top view of the power connector system 100 showing the connector assembly 102 and the second power component 106 partially mated with the first power connector 104. FIG. 8 shows the busbars 110 immediately before engagement with the sense contacts 312. The mating ends 352 of the sense contacts 312 extend into the housing slot 330 to engage the busbar 110. The sense contacts 312 are located on both sides of the housing slot 330 to interface with both sides 112, 114 of the busbar 110. The distal ends of the mating beams 356 of the sense contacts 312 are flared outward to guide mating of the mating beams 356 with the busbar 110. The sense contacts 312 are not electrically connected to the busbars 110 prior to contact of the mating beams 356 with the busbars 110.

The mating ends 352 of the sense contacts 312 are located rearward of the mating ends 252 of the power contacts 212. For a time during the mating process, after initial connection of the power contacts 212 to the busbar 110, the sense contacts 312 are not connected to the busbar 110. The sense circuit is inactive prior to the sense contacts 312 being electrically connected to the busbar 110. As such, the power circuit is deactivated, and power is unable to flow through the power connector system 100 when the sense contacts 312 are not connected to the busbar 110. Similarly, during un-mating, when the connector assembly 102 is in the positioner illustrated in FIG. 8 relative to the busbar 110, the sense contacts 312 are disengaged from the busbar 110, causing the power connector system 100 to deactivate the power circuit prior to un-mating of the power contacts 212 from the busbar 110.

Figure 9:
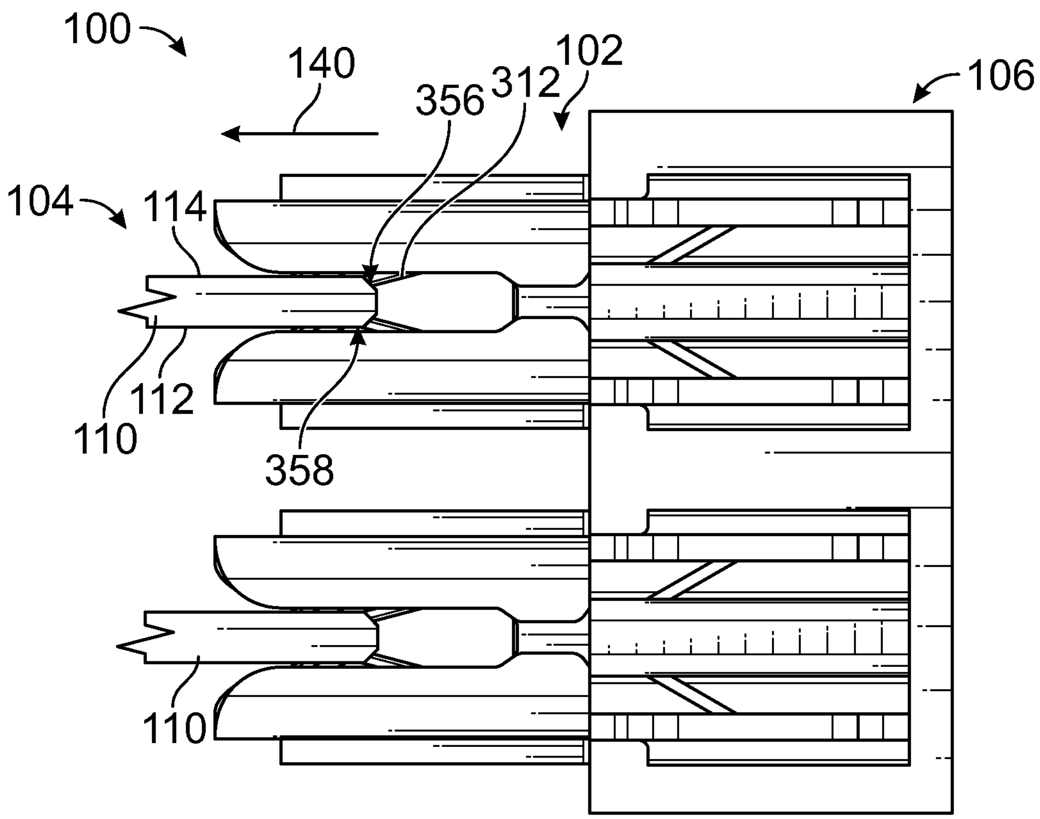
FIG. 9 is a top view of the power connector system showing the connector assembly and the second power component partially mated with the first power connector in accordance with an exemplary embodiment.

FIG. 9 is a top view of the power connector system 100 showing the connector assembly 102 and the second power component 106 partially mated with the first power connector 104. FIG. 9 shows the busbars 110 reliably connected to the sense contacts 312. As the connector assembly 102 continues in the mating direction 140, the mating beams 356 of the sense contacts 312 slide along the sides 112, 114 of the busbar 110. The mating interfaces 358 engage the sides 112, 114 to create a reliable electrical connection between the sense contacts 312 and the busbar 110.

Figure 10:
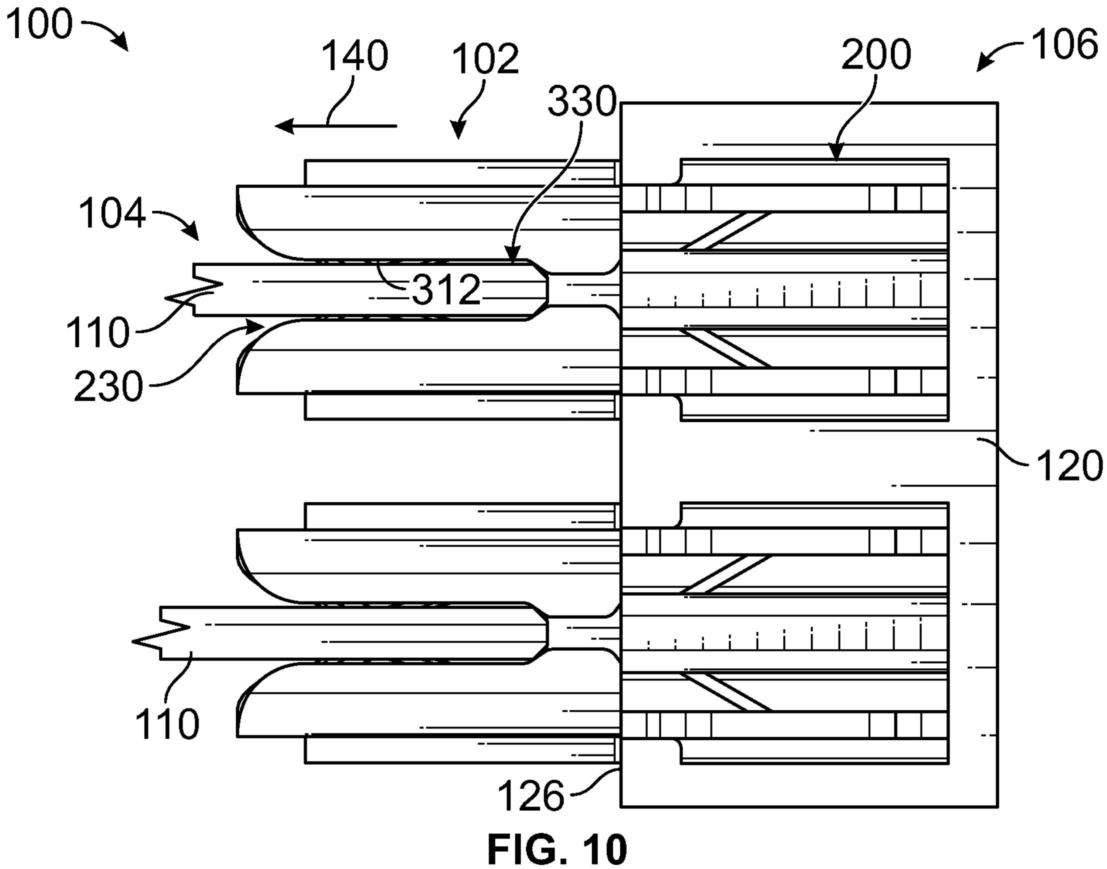
FIG. 10 is a top view of the power connector system showing the connector assembly and the second power component fully mated with the first power connector in accordance with an exemplary embodiment.

FIG. 10 is a top view of the power connector system 100 showing the connector assembly 102 and the second power component 106 fully mated with the first power connector 104. The connector assembly 102 may continue in the mating direction 140 until the edges 126 of the busbars 110 bottom out in the shell slot 230 and/or the housing slot 330. The power connector system 100 may operate normally in the fully mated position. For example, the sense contacts 312 are electrically connected to the busbar 110 to activate the sense circuit and activate the power circuit to allow power flow through the power connectors 200 between the busbar 110 and the printed circuit board 120.

Figure 11:
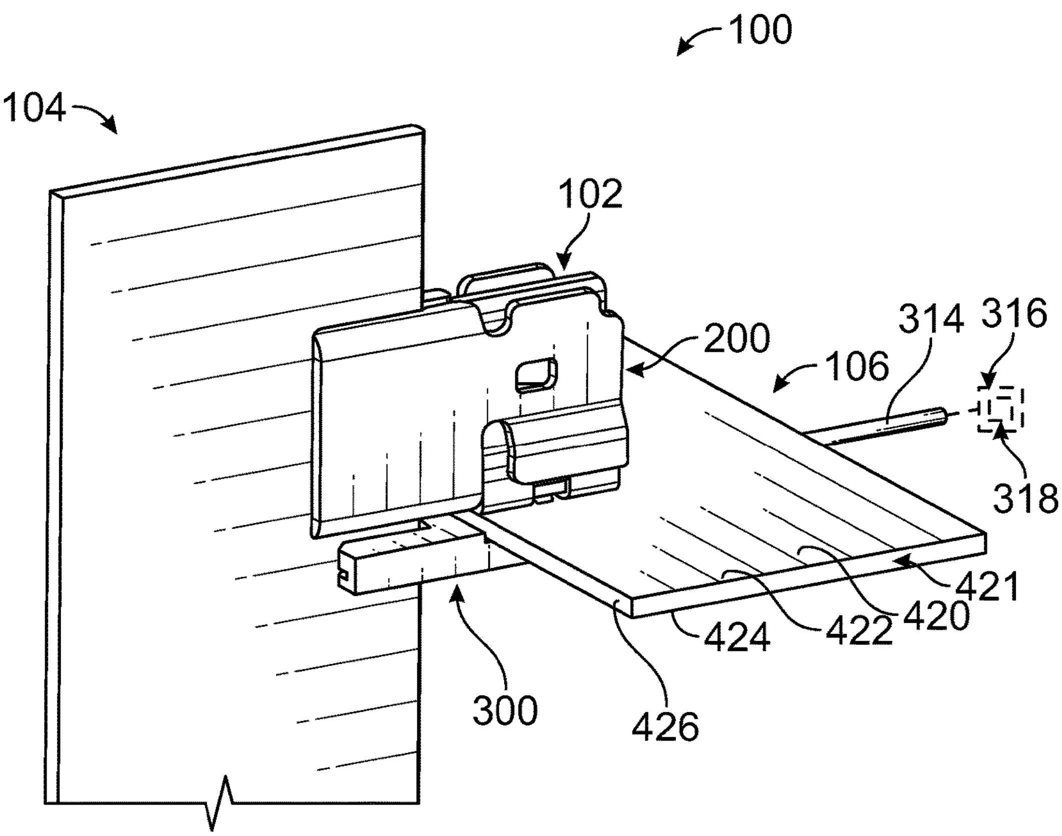
FIG. 11 is a top perspective view of the power connector system in accordance with an exemplary embodiment.
Figure 12:
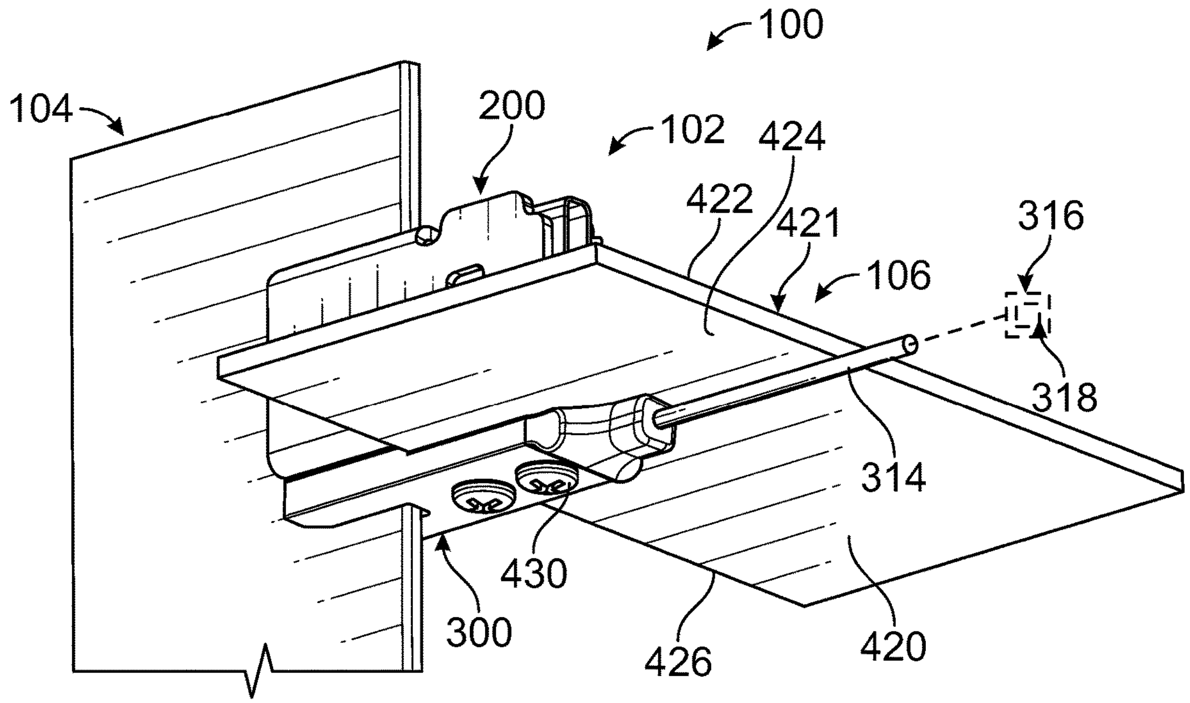
FIG. 12 is a bottom perspective view of the power connector system in accordance with an exemplary embodiment.

FIG. 11 is a top perspective view of the power connector system 100 in accordance with an exemplary embodiment. FIG. 12 is a bottom perspective view of the power connector system 100 in accordance with an exemplary embodiment. The power connector system 100 includes the connector assembly 102 used to electrically connect and supply power between the first power component 104 and the second power component 106. In the illustrated embodiment, the sense connector 300 of the connector assembly 102 includes a sense wire 314 connected to the sense contact 312. The sense wire 314 may be routed to a location remote from the sense connector 300 and the power connector 200, such as to a control module 316 having a sense circuit 318. The control module 316 may include a microcontroller or other processor for controlling operation of the power connector system 100. The control module 316 may include a switch or other device for controlling power supply to the first power component 104 and/or the second power component 106. For example, when the sense connector 300 is coupled to the first power component 104, power is able to flow through the power connector system 100. However, when the sense connector 300 is not coupled to the first power component 104, power is unable to flow through the power connector system 100. The sense connector 300 may detect when the connector assembly 102 is properly (for example, fully) mated to start the system. The sense connector 300 may detect when the connector assembly 102 is being unmated from the first power component 104 to shut the system off.

In the illustrated embodiment, the second power component 106 includes a power substrate 421 including a busbar 420. Other components (not shown) may be connected to the busbar 420. For example, a power take-off connector or power cable may be coupled to the busbar 420. Power is supplied to the busbar 420 through the connector assembly 102, such as through the power connector 200. However, in alternative embodiments, the power substrate 421 may include a printed circuit board similar to the printed circuit board 120.

The busbar 420 includes a first side 422 and a second side 424 opposite the first side 422. The busbar 420 includes an edge 426 at the front of the busbar 420. In an exemplary embodiment, the connector assembly 102 is mounted to the busbar 420 at the edge 426. For example, the power connector 200 is mounted to the first side 422 and the sense connector 300 is mounted to the second side 424. In various embodiments, the connector assembly 102 is secured to the busbar 420 using fasteners 430.

Figure 13:
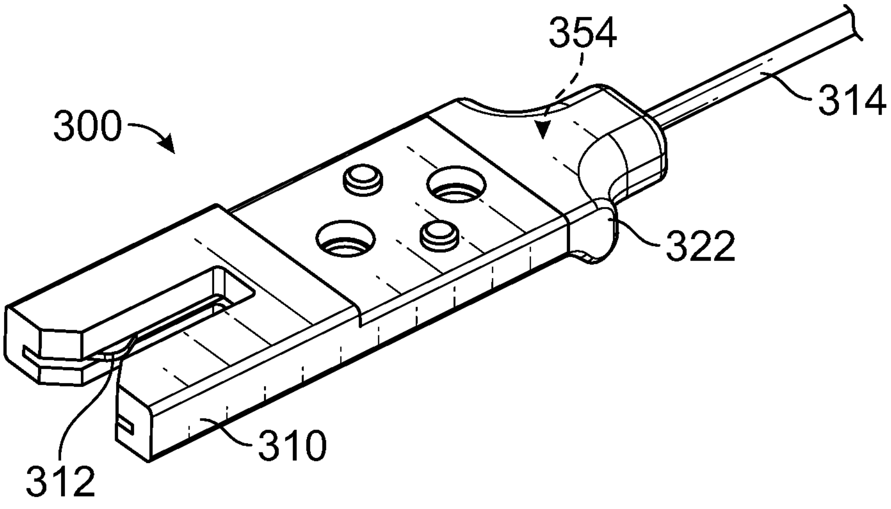
FIG. 13 is a perspective view of the sense connector in accordance with an exemplary embodiment.

FIG. 13 is a perspective view of the sense connector 300 in accordance with an exemplary embodiment. The sensor connector 300 includes the housing 310, the sense contact 312, and the sense wire 314. The sense wire 314 extends from the rear 322 of the housing 310. The sense wire 314 is connected to the terminating end 354 of the sense contact 312. The sense wire 314 may be soldered to the sense contact 312. However, in alternative embodiments, the sense wire 314 may be crimped to the sense contact 312 or connected by other processes.

Figure 14:
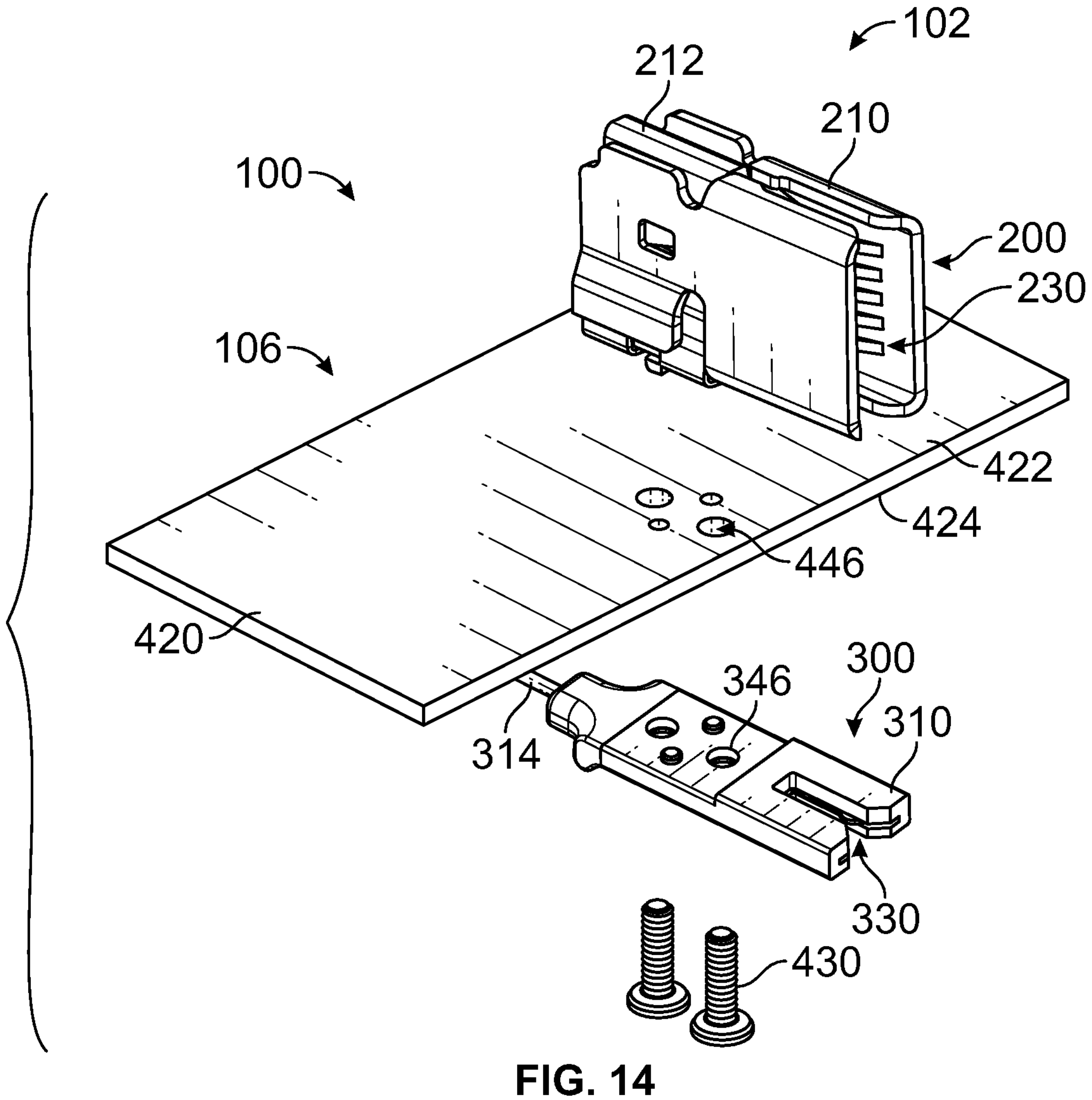
FIG. 14 is an exploded view of a portion of the power connector system showing the connector assemblies poised for coupling to the second power component in accordance with an exemplary embodiment.

FIG. 14 is an exploded view of a portion of the power connector system 100 showing the connector assemblies 102 poised for coupling to the second power component 106. For example, the power connectors 200 and the sense connector 300 are poised for coupling to the busbar 420. The power connectors 200 are coupled to the first side 422 (for example, the top) and the sense connectors 300 are coupled to the second side 424 (for example, the bottom). The sense wire 314 is routed away from the sense connector 300 and the power connector 200. In the illustrated embodiment, the sense wire 314 is routed along the second side 424 of the busbar 420.

During assembly, the power connectors 200 are aligned with corresponding mating areas at the first side 422 of the busbar 420 and the sensor connectors 300 are aligned with corresponding mating areas at the second side 424 of the busbar 420. The sensor connectors 300 are aligned with the power connectors 200. For example, the housing slots 330 of the housing 310 may be aligned with the shell slots 230 of the shells 210 to receive the corresponding busbars 110. The fasteners 430 pass through the openings 346 and pass-through openings 446 in the busbar 420 to secure the power connectors 200 and the sensor connectors 300 to the busbar 420.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembly comprising:

a power connector including a first power interface configured to interface with a first power component and a second power interface configured to interface with a second power component, the power connector including a shell having a first wall and a second wall forming a cavity, the shell having a shell slot at the first power interface to receive the first power component, the power connector including a power contact received in the cavity, the power contact extending between the first power interface and the second power interface to electrically connect the first power component to a power circuit of the second power component; and a sense connector separate and discrete from the power connector, the sense connector including a first sense interface configured to interface with the first power component and a second sense interface configured to interface with the second power component, the sense connector including a housing holding a sense contact, the housing electrically isolating the sense contact from the shell, the sense contact extending between the first sense interface and the second sense interface to electrically connect the first power component to a sense circuit of the second power component.

2. The connector assembly of claim 1, wherein the power contact mates to the first power component prior to the sense contact, and wherein the sense contact is unmated from the first power component prior to the power contact to control power supply through the power connector.

3. The connector assembly of claim 1, wherein the housing of the sense connector is spaced apart from the shell of the power connector.

4. The connector assembly of claim 1, wherein the housing of the sense connector engages the shell of the power connector.

5. The connector assembly of claim 1, wherein the housing includes a housing slot aligned with the shell slot to receive the first power component.

6. The connector assembly of claim 1, wherein the shell is a metal shell, the power contact being electrically connected to the metal shell.

7. The connector assembly of claim 1, wherein the first power interface is at a front of the power connector and the second power interface is at a bottom of the power connector.

8. The connector assembly of claim 1, wherein the sense connector further comprises a sense wire coupled to the sense contact, the sense wire configured to be electrically connected to the sense circuit of the second power component.

9. The connector assembly of claim 1, wherein the sense contact includes a contact tail extending from the housing, the contact tail configured to be coupled to the second power component.

10. The connector assembly of claim 1, further comprising a fastener coupled to the shell and coupled to the housing, the fastener configured to be coupled to the second power component to secure the power connector and the sense connector to the second power component.

11. A power connector system comprising:

a power substrate including a power circuit;

a power connector mounted to the power substrate, the power connector including a first power interface configured to interface with a power component and a second power interface electrically connected to the power circuit of the power substrate, the power connector including a shell having a first wall and a second wall forming a cavity, the shell having a shell slot at the first power interface to receive the first power component, the power connector including a power contact received in the cavity, the power contact extending between the first power interface and the second power interface to electrically connect the first power component to the power circuit of the power substrate; and a sense connector separate and discrete from the power connector, the sense connector mounted to the power substrate, the sense connector including a first sense interface configured to interface with the first power component, the sense connector including a housing holding a sense contact, the housing electrically isolating the sense contact from the shell, the sense contact electrically connecting the first power component and a sense circuit configured to control power supply between the first power component at the power circuit.

12. The power connector system of claim 11, wherein the power substrate includes a first side and a second side, the power connector coupled to the first side, the sensor connector coupled to the second side.

13. The power connector system of claim 11, wherein the power substrate includes a front edge, the power connector extending forward of the front edge for mating with the power component, the sense connector extending forward of the front edge for mating with the power component.

14. The power connector system of claim 11, wherein the power substrate is a printed circuit board.

15. The power connector system of claim 11, wherein the power substrate is a busbar.

16. The power connector system of claim 11, wherein the power contact mates to the first power component prior to the sense contact, and wherein the sense contact is unmated from the first power component prior to the power contact to control power supply through the power connector.

17. The power connector system of claim 11, wherein the housing includes a housing slot aligned with the shell slot to receive the first power component.

18. The power connector system of claim 11, further comprising a fastener coupled to the shell and coupled to the housing, the fastener coupled to the power substrate to secure the power connector and the sense connector to the power substrate.

19. A power connector system comprising:

a power substrate having a first side and a second side;

a power connector mounted to the first side of the power substrate, the power connector including a first power interface configured to interface with a power component and a second power interface electrically connected to the first side of the power substrate, the power connector including a shell having a first wall and a second wall forming a cavity, the shell having a shell slot at the first power interface to receive the first power component, the power connector including a power contact received in the cavity, the power contact extending between the first power interface and the second power interface to electrically connect the first power component to the power substrate; and a sense connector separate and discrete from the power connector, the sense connector mounted to the power substrate, the sense connector including a first sense interface configured to interface with the first power component, the sense connector including a housing holding a sense contact, the housing electrically isolating the sense contact from the shell, the sense connector including a sense wire terminated to the sense contact, the sense wire extending from the housing to electrically connect the first power component to a sense circuit to control power supply between the first power component and the power substrate.

20. The power connector system of claim 19, further comprising a fastener coupled to the shell and coupled to the housing, the fastener coupled to the power substrate to secure the power connector and the sense connector to the power substrate.

* * * * *